United States Patent [19]
Matsumoto

[11] Patent Number: 5,521,826
[45] Date of Patent: May 28, 1996

[54] TRAVEL GUIDING APPARATUS FOR VEHICLE

[75] Inventor: Yoshiyuki Matsumoto, Saitama, Japan

[73] Assignee: Honda Giken Kogyo Kabushiki Kaisha, Tokyo, Japan

[21] Appl. No.: 361,013

[22] Filed: Dec. 21, 1994

Related U.S. Application Data

[63] Continuation of Ser. No. 992,925, Dec. 18, 1992, abandoned.

[30] Foreign Application Priority Data

Dec. 18, 1991 [JP] Japan ................ 3-361062

[51] Int. Cl.$^6$ ................................. G06F 165/00
[52] U.S. Cl. .................. 364/449; 364/444; 340/990; 340/995
[58] Field of Search ................. 364/443, 444, 364/449; 73/178 R; 340/988, 990, 995

[56] References Cited

U.S. PATENT DOCUMENTS

| | | | |
|---|---|---|---|
| 4,926,336 | 5/1990 | Yamada | 364/444 |
| 4,962,458 | 10/1990 | Verstraete | 364/444 |
| 4,984,168 | 1/1991 | Neukrichner et al. | 364/449 |
| 5,031,104 | 7/1991 | Ikeda et al. | 340/995 |
| 5,184,303 | 2/1993 | Link | 364/444 |
| 5,187,667 | 2/1993 | Short | 364/444 |
| 5,204,817 | 4/1993 | Yoshida | 364/444 |
| 5,220,507 | 6/1993 | Kirson | 364/444 |
| 5,270,937 | 12/1993 | Link et al. | 340/995 |
| 5,272,638 | 12/1993 | Martin et al. | 364/444 |
| 5,285,391 | 2/1994 | Smith, Jr. et al. | 340/995 |

FOREIGN PATENT DOCUMENTS

| | | |
|---|---|---|
| 62-133600 | 6/1987 | Japan . |
| 1-173297 | 7/1989 | Japan . |

Primary Examiner—Gary Chin
Attorney, Agent, or Firm—Lyon & Lyon

[57] ABSTRACT

Disclosed is a vehicle travel guiding apparatus for searching a course having the least cost of line segments between a start and a target points preset on a road map indicated on a display screen according to digitized map data, wherein when a plurality of courses are searched one by one by priority of smaller cost of line segments' for the purpose of selecting an optimal course with due consideration of traffic conditions, the segments' cost of the last searched course is apparently increased before searching next one so as to eliminate the possibility of selecting the like course again.

8 Claims, 4 Drawing Sheets

1

TRAVEL GUIDING APPARATUS FOR VEHICLE

This application is a continuation of Ser. No. 07/992,925, file Dec. 18, 1992 and now abandoned.

BACKGROUND OF THE INVENTION

The present invention relates to a travel guiding apparatus for vehicle, which is capable of guiding a vehicle by searching a course from a starting point to a target point on a road map shown on a display screen.

The Japanese laid open patent publications No.133600-87 and No. 173297-89 disclose such a vehicle travel guiding apparatus which is capable of setting any start and target points on a road map shown on a display screen and searching digital map data to find an optimal route therebetween for the purpose of guiding the vehicle.

The digital map information contains data on positions and connections of nodes N of line segments which, as shown in FIG. 4, approximately represent a figure of actual mapped roadways shown in FIG. 3.

A prior method for searching a course on the basis of the digital map data is such that nodes on a road map are sequentially searched according to a known algorithm such as "Dijkstra" so as to obtain the shortest distance from a start point to a target point, whereat line segments connecting the start point with the target point are of least cost, for example, in terms of total length (distance) or mean travel time to be required or in combination with other roadway's parameters such as road width, user tax and the like.

It may be considered that a plurality of possible different courses from the start point to the target point are searched one by one priority of smaller cost of line segments therebetween and one of them is finally selected.

However, when the driver does not desire to select the first searched course (shown in FIG. 5) because of, for example, a congested street included therein and he requests finding another course, the apparatus may search a next course that is almost the same as the previous one but has a minimum bypassing as shown in FIG. 6. This, of course, does not meet the driver's requirement.

In case when the driver requests another course from the start point to the target so as to find optimal one with due consideration, for example, of traffic congestion, the apparatus is requested to search an effective course that is different from the previously searched one.

The problem to be solved is that when searching two or more different courses between a start and a target point set on a road map shown a display screen on the basis of digital data of the road map by priority of smaller cost of its total line segments, the conventional apparatus can select only a course substantially similar to the preceding one, omitting different courses from the scope of searching.

SUMMARY OF THE INVENTION

In view of the foregoing, the present invention was made to provide a vehicle travel guiding apparatus which is capable of searching a plurality of different courses from a start point to a target one by one by priority of smaller cost of total line segments composing the route on the basis of digital data of a road map in such a way that a subsequent optimal route may be searched after apparently increasing cost of the line segments of the previously searched one.

Figure 1:
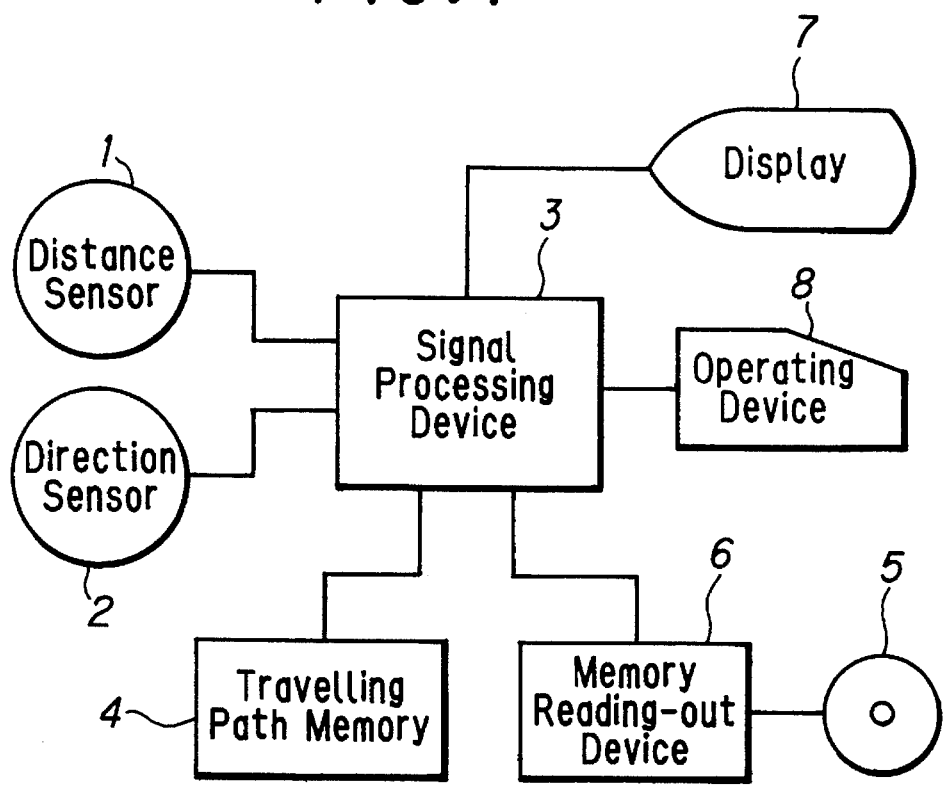
FIG. 1 is a block diagram showing an example of a vehicle travel guiding apparatus embodying the present invention.

In the drawings, 1 is a distance sensor, 2 is a direction sensor, 3 is a signal processing device, 4 is a travelling path memory, 5 is a map information memory, 6 is a memory reading-out device, 7 is a display and 8 is a operating device.

DESCRIPTION OF THE PREFERRED EMBODIMENTS

Referring now to the drawings, a preferred embodiment of the present invention will be described in detail as follows:

It will be observed from FIG. 1 that a vehicle travel guiding apparatus according to the present invention comprises, for example, a distance sensor 1 producing a pulse signal per unit running distance to be determined by rotations per minute of the vehicle wheel axis; a direction sensor producing an output signal proportional to a change of the vehicle running direction, e.g. a change of angular velocity of yaw direction; a microcomputer-aided processing unit 3 which calculates a travelling distance of the vehicle by counting a number of pulse signals from the distance sensor 1, determines current location of the vehicle by X-Y coordinates by sequential calculation and controls the whole system of the travel guiding apparatus; a travelling path memory 4 for sequentially storing continuously changing data on coordinates of vehicle's current location and keeping said data as information of finite sequential locations; a map information memory 5 wherein digitized road map data are preliminarily stored; a reading-out device 6 for selectively reading-out road map data for necessary areas from the memory 5; a display unit 7 for indicating on its screen a road map reproduced on the basis of the read-out digital road map data and also for indicating thereon renewable current location of the vehicle together with its travelling path and direction as necessary; an operating device 8 which gives operational commands to the signal processing unit 3 for selecting a road map area to be indicated on the screen of the display unit 7 and setting a start and a target points on the indicated map, and also selectively gives commands necessary for indicating travelling path and running direction, changing over the direction of the indicated map and running path, sifting indicating positions, partially enlarging the map and travelling path, selecting a scale of a picture on the display screen and changing other settings for displaying.

In the apparatus, a road map is selectively read out and indicated the screen of the display unit 7, a current location of the vehicle in X-Y coordinate system is continuously calculated to be renewed with the vehicle travelling according to the map scale preset by the signal processing unit 3, the calculation results are subsequently sent to the travel path memory unit 4 which in turn renews its memory content and the renewed information is read out therefrom and sent to the display unit 7.

Figure 2:
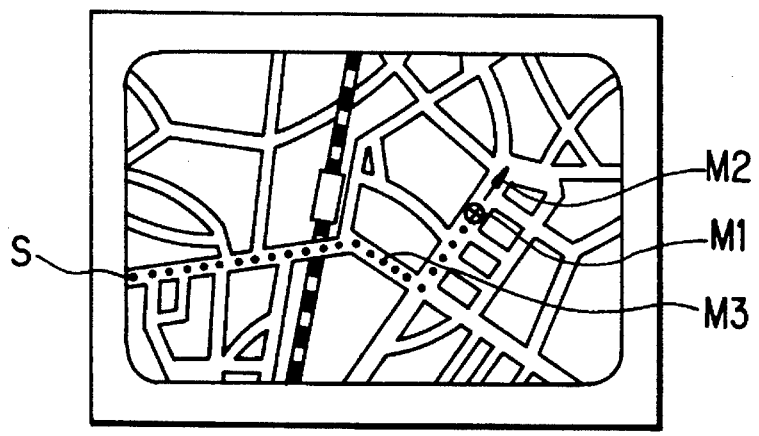
FIG. 2 shows an example of the content of a picture shown on a display screen of the apparatus shown in FIG. 1.
Figure 3:
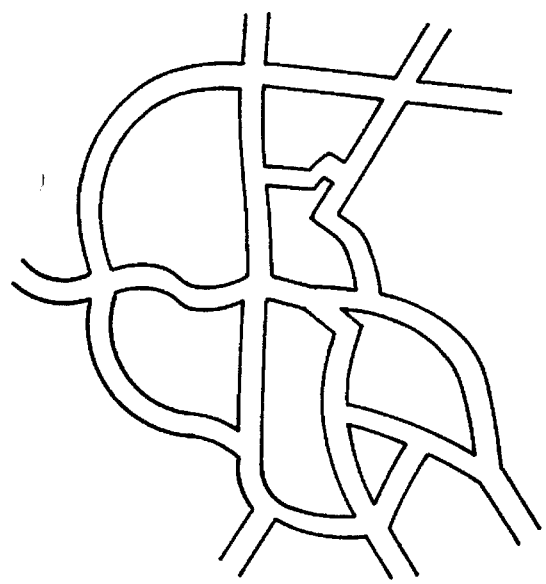
FIG. 3 shows an example of a figure of actual roadways.
Figure 4:
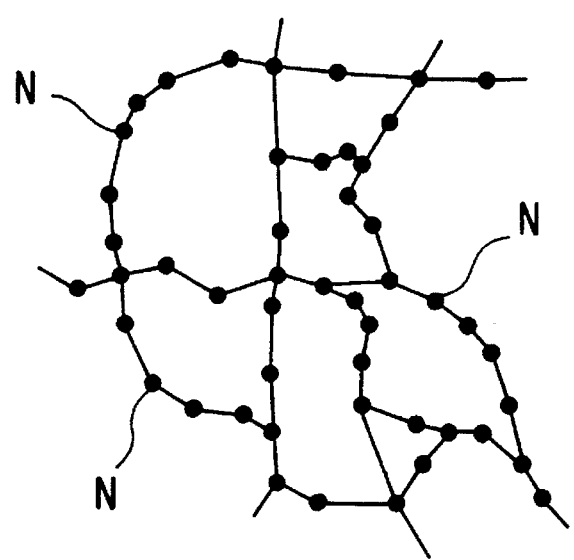
FIG. 4 shows a digital map image of the road shown in FIG. 3.
Figure 5:
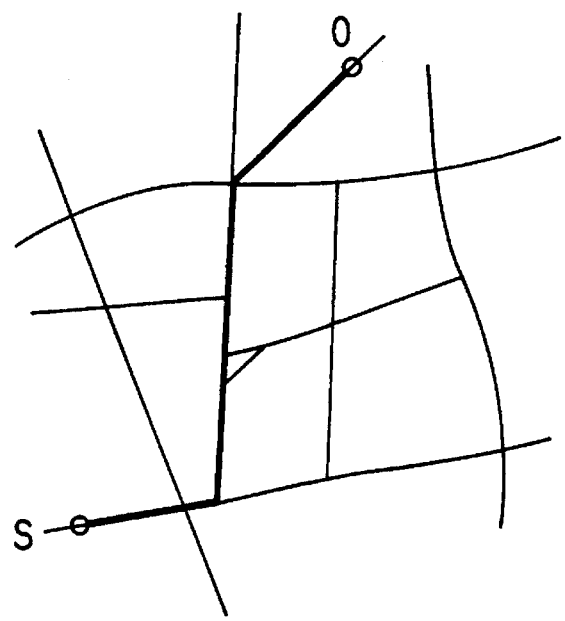
FIGS. 5 shows an example of a last searched travelling course.
Figure 6:
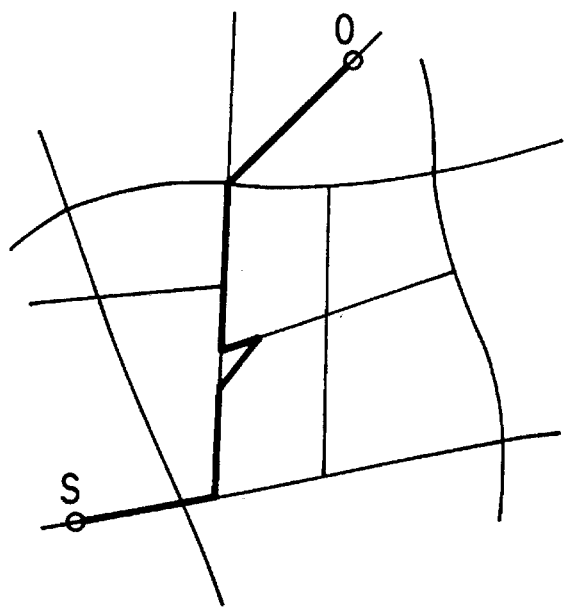
FIG. 6 shows an example of a course which has a path partially bypassing by a small distance from the last searched course.
Figure 7:
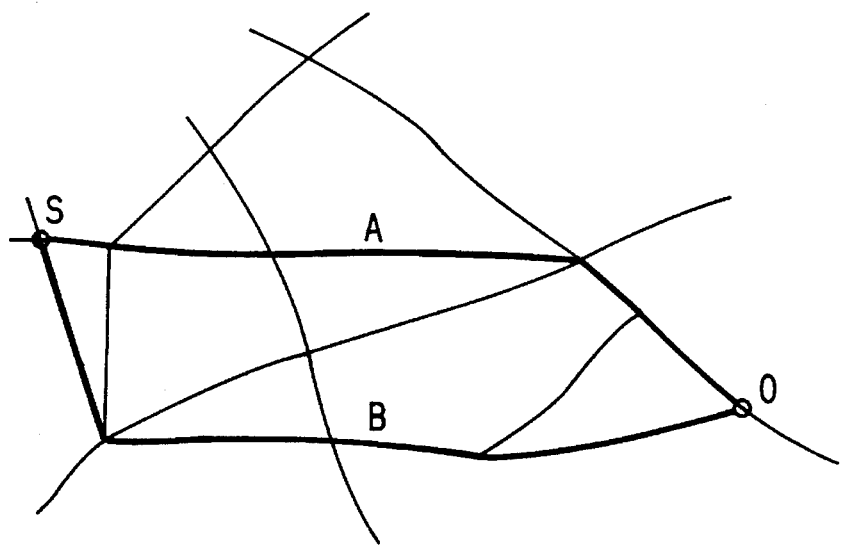
FIG. 7 shows an example of a different course searched next to the last one.

As shown in FIG. 2, while the vehicle travels on the roadway, the display unit 7 indicates the road map on its screen, imitatively indicating thereon marks M1, M2 and M3 which denote, respectively, the vehicle's current position, its current running direction and travel path from the start point S to the current position.

The vehicle travel guiding apparatus according to the present invention is capable of searching a course having a least cost of line segments (e.g. distance, mean required travelling time or the combination of them) from a start point to a target point preset on the road map shown on the display screen according to the digital road map data read-out from the road map memory 5 by the signal processing unit 3; determining an optimal route with consideration of traffic conditions such as one-way traffic or the like and indicating said course in a special color on the road map on the display screen and renewing the current location of the vehicle in the indicated course so as to guide the vehicle driver.

There are many kinds of known methods applicable for a basic algorithm for searching travelling courses and also for determining an optimal one.

The present invention provides the possibility of cancelling the searched course by reason of undesirable traffic conditions by inputting a cancelling command into the signal processing unit 3 through the operating device 8.

When the searched course was cancelled, the signal processing unit 3 searches another course having a series of least costing segments from the start point to the target points.

In this case the cost of line segments of the cancelled course A is preliminarily and apparently increased so as to eliminate the possibility of searching a course similar to the cancelled course A and to select another course B being substantially different from the course A.

In practice, the above-mentioned processing is carried out, for example, in the following manner:

If a total number of line segments l of a course from a start point to a target point preset on a road map is N={1,2,3, ... n} and a set of line segments is {lili=[1,n]}, a course P from the start point to the target point is represented by the following equation (1):

$$P=\{lp1, lp2, lp3, \ldots lpk | p1, p2 \ldots \epsilon N\} \quad (1)$$

where the course P is also expressed as follows:

$$P=\{P1, P2, P3, \ldots Pk\} \quad (2)$$

Denoting the cost of the line segments lpi (only a distance in this case) by Cpi, the distance between the start point and the target point is given by the following equation (3):

$$L = \Sigma C p i \quad (3)$$

Now we suppose that a course P having the least cost (least distance) of line segments is found.

If it is necessary to cancel the searched course P, the costs (Cp1, Cp2, Cp3, ...) of the line segments (lp1, lp2, lp3 ...) constituting the course to be cancelled are substituted by values (Cp1', Cp2', Cp3' ...) according to the following equation (4):

$$\left.\begin{array}{l} Cpi' = Cp1 * x + y \\ Cp2' = Cp2 * x + y \\ \vdots \\ Cpk' = Cpk * x + y \end{array}\right\} \quad (4)$$

where x is a weight coefficient (x≥1.0) and y is a weight (y≥0.0). In practice, setting is made, for example, as x=1.2 and y=0.1.

When another course P' having the least cost (least distance) of line segments from the start point to the target point is searched after cancelling the preceding course and substituting the costs (Cp1,Cp2,Cp3 ...) of its line segments (lp1, lp2, lp3, ...), it may differ from the cancelled course P since latter has apparently increased cost of its segmental components which may be avoided as far as possible.

By forcing the apparatus repeat the above-mentioned processing it is possible to further find the 3rd course, the 4th course and so on by priority of smaller cost of line segments.

Figure 8:
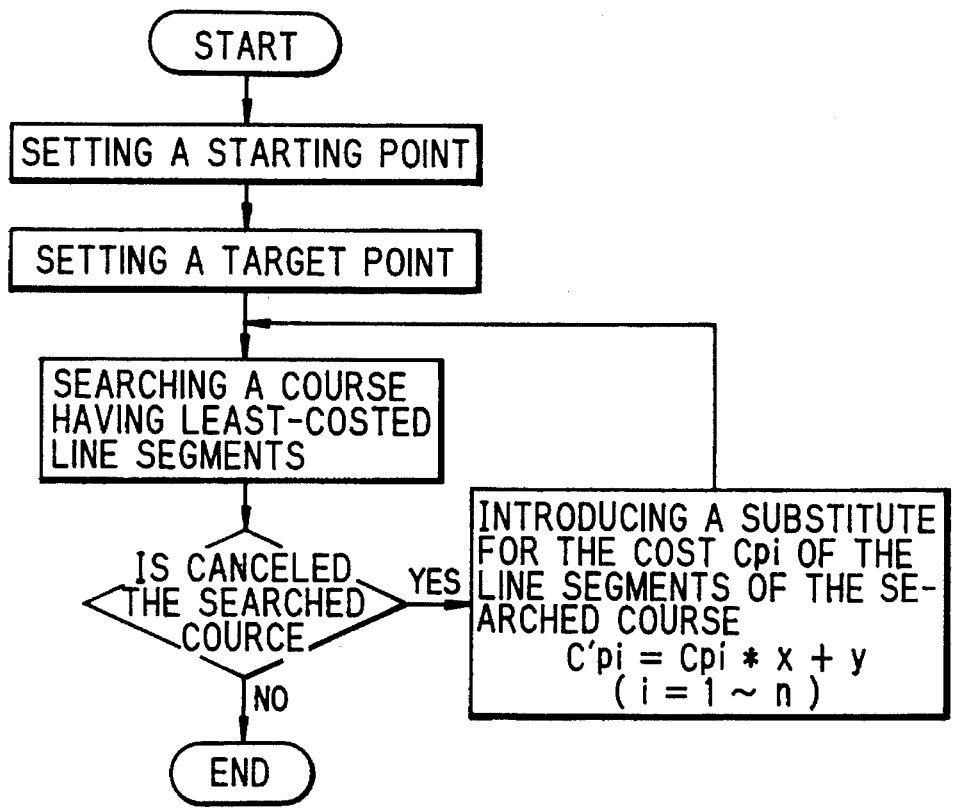
FIG. 8 is a flow chart of data processing for changing a searched course to next one.

FIG. 8 shows a flow-chart of switching-over the processing operation to searching another course by the apparatus proposed by the present invention.

If there are a small number of roadways on the map, the repeat searching may lead to select again the cancelled course having the segments' cost increased, for example, by 1.2 times. In such case it is recommendable to increase the preset value "x" to 1.5–2.0.

In case of repeat searching in a city area map including many selectable roadways it is preferable to set "x" to 1.1–1.3 with consideration of the possibility of searching a course having a portion commonly included in the cancelled course.

The weight coefficient "x" and the weight "y" may be also variable if occasion demands.

Besides the distance, the cost of line segments can be determined as mean required travelling time, combination of distance and mean required travelling time, or combination of distance, mean required traveling time and other roadway's attributes such as road width, passing tax and the like.

As is apparent from the foregoing description, the vehicle travel guiding apparatus according to the present invention offers such an advantage that when searching a plurality of courses having the least cost of line segments from a start point to a target point preset on a road map indicated on a display screen on the basis of digitized map data by the priority of the smaller cost, it is capable of apparently increasing the segments' cost of the previously searched course and then finding-out another course being substantially different from the searched and cancelled one. This makes it possible to repeat searching an optimal course with consideration of the traffic conditions without selecting the like course again.

What is claimed is:

1. A vehicle travel guiding system comprising:

a distance sensor for sensing distance travelled by the vehicle;

a direction sensor for sensing the direction of travel of the vehicle;

a travelling course memory for sequentially storing continuously changing data on the vehicle's location;

a map memory for storing digitized road map data;

a display for indicating a road map reproduced on the basis of the road map data and for indicating the current location and direction of the vehicle; and a processor linked to the distance sensor, direction sensor, travelling course memory, and map memory, and the display, for determining the location of the vehicle, the processor having:

course selecting means for selecting a first course of travel comprising sequentially connected road segments, with each road segment in the first course assigned a cost based on at least one travel parameter; and cancelling means actuated by a vehicle operator or passenger for cancelling the first course of travel and automatically selecting a second course of travel substantially different from the first course of travel, by uniformly increasing the assigned cost of each road segment in the first course of travel by multiplying the cost of each such road segment by the sum of a weight Y and a weight coefficient X wherein $X \geq 1.0$ and $Y \geq 0.0$ and are selected to have the second course of travel be substantially different from the first course.

2. The vehicle travel guiding system of claim 1, wherein the travel parameter is selected from the group consisting of distance; road width; user tax; traffic conditions; travelling time; and a combination thereof.

3. A vehicle travel guiding system for searching a course made up of line segments, between a start point and a target point on a road map indicated on a display screen according to digitized map data including data on the positions of the tip points of line segments and connecting nodes obtained by approximating a figure of actual roadway with the line segments, and with each line segment assigned a cost based on at least one travel parameter, and with the system searching for a course having a minimum cost comprising:

cancelling means manually engaged by the operator for cancelling the searched course having a least cost of line segments;

cost increasing means, responsive to the cancelling means, for automatically increasing the cost of each of the line segments in the searched course; and secondary searching means for searching a second course having a least line segment costs, from among all of segments of the digitized map data including the segments of the first course having increased costs.

4. A vehicle travel guiding apparatus according to claim 3 wherein the cost of each line segment is directly proportional to distance.

5. A vehicle travel guiding apparatus according to claim 3 wherein the cost of each line segment is directly proportional to travelling time.

6. A vehicle travel guiding apparatus according to claim 3 wherein the cost of each line segment is proportional to a combination of distance and required travelling time.

7. A vehicle travel guiding apparatus according to claim 3, wherein the cost of each line segment is proportional to a combination of the distance, the required travelling time and roadway characteristics of the segment.

8. A vehicle travel guiding system comprising:

a) a distance sensor for sensing distance travelled by the vehicle;

b) a direction sensor for sensing the direction of travel of the vehicle;

c) a travelling course memory for sequentially storing continuously changing data on the vehicle's location;

d) a map memory for storing digitized road map data;

e) a display for indicating a road map reproduced on the basis of the road map data and for indicating the current location and direction of the vehicle;

f) a processor having:
1) means for identifying line segments from the map data;
2) means for assigning a cost to each line segment identified, based on at least one travel parameter;
3) means for selecting a first route of line segments connecting a starting point and a destination point, having a minimum cost;
4) means for cancelling the first route, operable by an occupant of the vehicle, after reviewing the first route on the display;
5) means for automatically increasing the cost of each line segment in the first route by a preselected amount, responsive to the means for cancelling; and
6) means for selecting a second route of line segments having a minimum cost, responsive to the cancelling means, from among the identified line segments, including the line segments of the first route having increased costs.

* * * * *